United States Patent

[11] 3,601,868

| [72] | Inventor | Edwin C. Elsner<br>Tujunga, Calif. |
|---|---|---|
| [21] | Appl. No. | 824,464 |
| [22] | Filed | May 14, 1969 |
| [45] | Patented | Aug. 31, 1971 |
| [73] | Assignee | Aeroquip Corporation<br>Jackson, Mich. |

[54] BOLT TENSION GAUGE
7 Claims, 9 Drawing Figs.

[52] U.S. Cl. .................................................. 24/279, 85/62

[51] Int. Cl. .................................................. B65d 63/06, F16b 31/02

[50] Field of Search .......................................... 24/279; 85/62

[56] References Cited
UNITED STATES PATENTS

| 2,476,561 | 7/1949 | Pedersen ...................... | 85/62 |
| 2,824,481 | 2/1958 | Johnson ....................... | 85/62 |
| 2,830,486 | 4/1958 | Dillon ........................... | 85/62 |

Primary Examiner—Donald A. Griffin
Attorney—Jerry K. Harness

ABSTRACT: A T-bolt used to clamp a strap is tightened by a nut. A gauge is disposed between this nut and an abutment carried by the strap. The gauge comprises a cylindrical shell flattened on opposite sides and with a bore of predetermined diameter. A plug is disposed within this bore and has a bar at one end at right angles to the bolt and slightly larger than the bore by a predetermined amount. The nut is tightened until this bar may be manually pushed into the elongated bore at which point a predetermined bolt tension has been achieved.

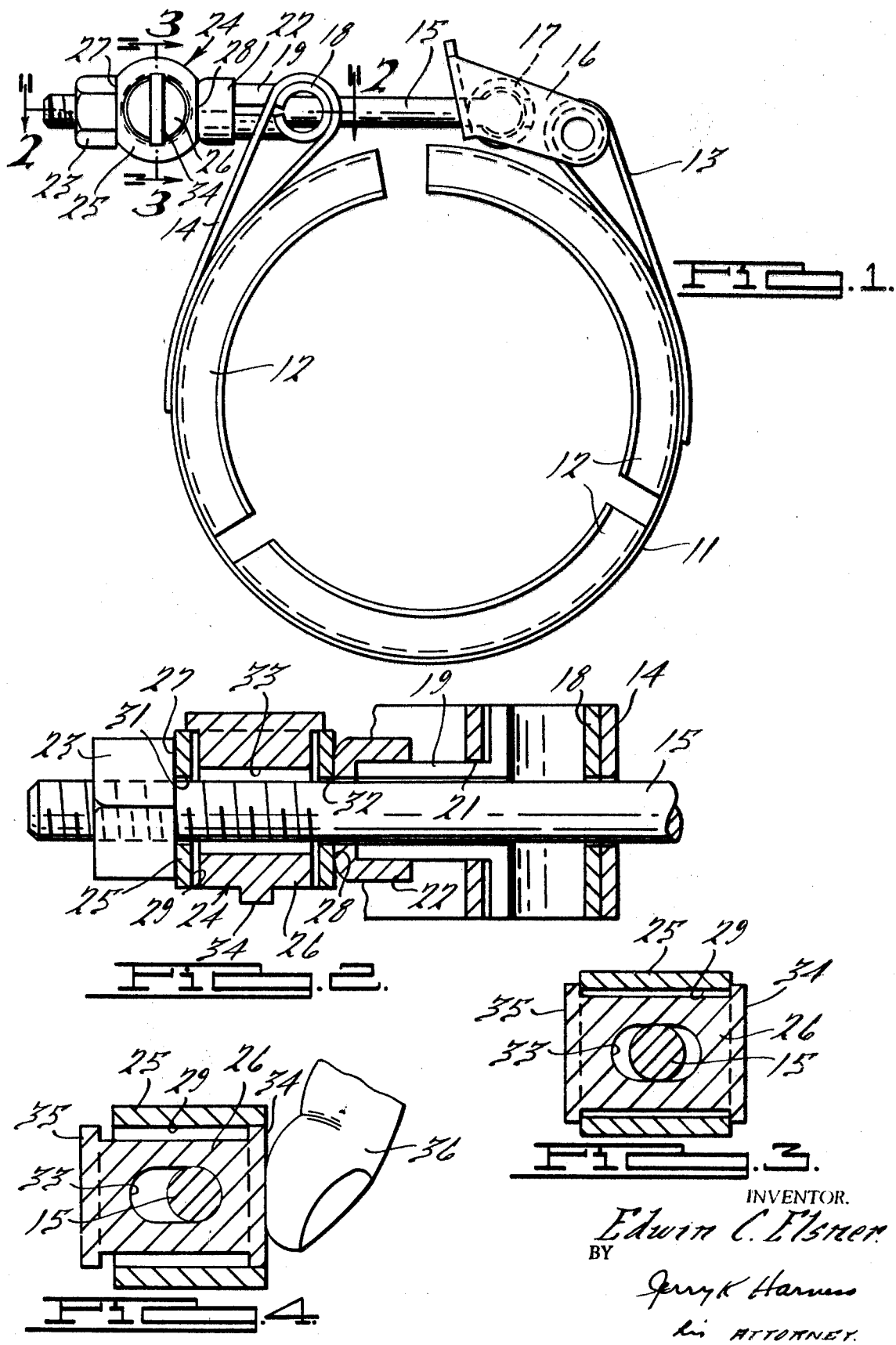

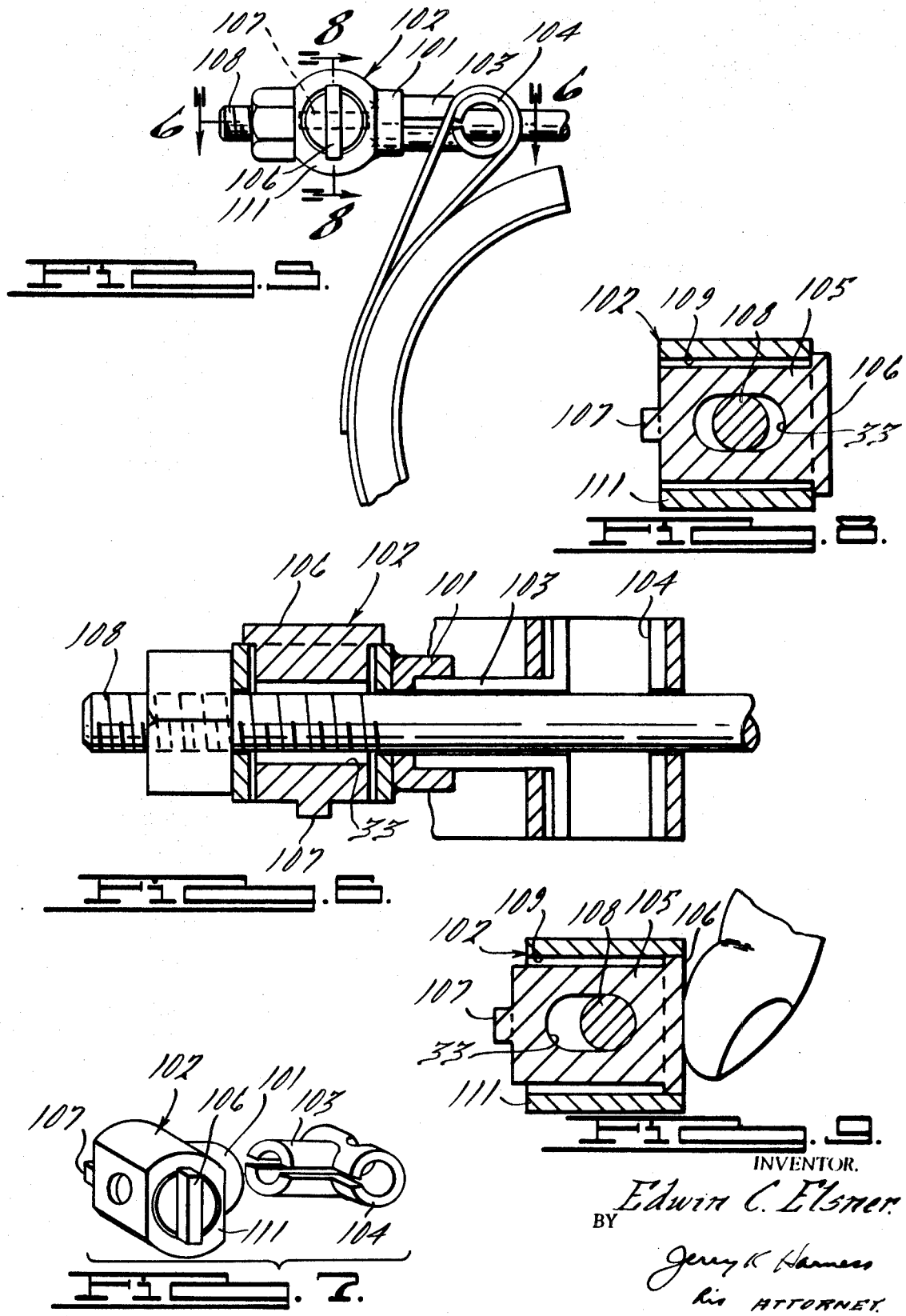

3,601,868

BOLT TENSION GAUGE

BACKGROUND OF THE INVENTION

1. Field of the Invention

The invention relates to gauges for measuring tension in a bolt. The achievement of proper bolt tension is often quite critical. For example, when tightening T-bolts which clamp straps for hoses and fittings, insufficient bolt tightening may result in loosening of the strap through vibration whereas overtensioning creates excessive stress which could weaken the bolt, eventually resulting in failure.

2. Description of the Prior Art

Torque wrenches have been used in an attempt to control bolt tension. However, this is sometimes an unsatisfactory method in that measurement of torque needed to turn a nut is only an indirect and often inaccurate measurement of the actual degree of residual tension in the bolt.

BRIEF SUMMARY OF THE INVENTION

According to the invention, a device is placed on the bolt which is responsive to the axial force created on the nut when it is tightened, this axial force being directly related to the tensile force in the bolt. As illustrated, the device comprises a cylindrical shell of predetermined length and having a bore of a certain diameter. Opposite sides of this shell are flattened to provide bearing surfaces for the nut and for an abutment member carried, for example, by one end of a strap being tightened by a T-bolt. A plug is disposed in this shell, the plug having an elongated slot, perpendicular to the bolt axis, through which the bolt extends, and a bar at one end slightly longer than the predetermined shell bore diameter. This bar has a specified length and extends at right angles to the bolt axis, so that as the nut is tightened and the shell bore is deformed from its unstressed shape, the bar may be manually pushed into the bore. This will indicate that the desired tension in the bolt has been achieved.

Since the gauge remains as part of the assembly, it is always available for inspection to see whether an underload or an overload exists in the bolt. Moreover, if it is desired to loosen and retighten the clamp, this may be done without removal of the nut from the bolt and upon retightening the identical residual tension in the bolt may again be achieved. By changing the physical dimensions of the gauge, it is possible to obtain, within practical limits, a measurement of any desired residual tension. An enlargement is provided at the other end of the plug for retaining the plug in the shell when the gauge is disassembled.

BRIEF DESCRIPTION OF THE DRAWINGS

FIG. 1 is a side elevational view of a strap having T-bolt which utilizes the gauge of this invention.

FIG. 2 is a fragmentary cross-sectional plan view taken along the line 2—2 of FIG. 1, parts being broken away, and showing the position of the gauge parts before nut tightening;

FIG. 3 is a cross-sectional view taken along the line 3—3 of FIG. 1, and showing the bolt clearance slot in the plug, FIG. 4 is a cross-sectional view similar to FIG. 3 but showing the bar of the plug manually pushed into the shell bore;

FIG. 5 is a fragmentary elevational view of a strap clamped by a T-bolt and with a second embodiment of the invention applied to the bolt, this embodiment having an adapter attached thereto for cooperation with an abutment carried by the strap, FIG. 6 is a cross-sectional view taken along the line 6—6 of FIG. 5 and showing the bolt clearance slot in the plug;

FIG. 7 is a perspective view showing the cooperation between the gauge and the abutment member carried by the strap;

FIG. 8 is a cross-sectional view taken along the line 8—8 of FIG. 5 and showing the parts in their position before the nut is tightened, and FIG. 9 is similar to FIG. 8 but showing the bar of the plug manually pushed into the shell bore.

DESCRIPTION OF THE PREFERRED EMBODIMENTS

Referring first to the embodiment of FIGS. 1 through 4, a strap 11 is shown of the type used to clamp hoses to fittings. This strap has a plurality of inner bearing members 12. The ends of strap 11 are looped back on themselves as shown at 13 and 14 to hold retaining means for a T-bolt 15. More particularly, a retaining member 16 is pivotally mounted on loop 13 and holds the head 17 of T-bolt 15. The T-bolt passes through an abutment member 18 held by loop 14. This abutment member, in the form shown in FIGS. 1 through 4, has a cylindrical portion held by loop 14 and an axial portion 19 extending through a slot 21 in loop 14, as seen in FIG. 2. A cap 22 is mounted on the outer end of axial portion 19. Bolt 15 is freely movable in an axial direction within the assembly comprising abutment member 18 and cap 22.

Bolt 15 is to be tightened by a nut 23 threaded thereon and it is the purpose of the present invention to provide means for gauging when nut tightening has produced the proper bolt tension. The gauge is generally indicated at 24 and comprises a shell 25 and a plug 26. Shell 25 is of generally cylindrical shape and is manufactured of a heat treatable alloy, the part being so designed that for its intended application the applied stresses will never exceed the elastic limit of the shell. The two opposite sides 27 and 28 of shell 25 are flattened as seen in FIGS. 1 and 2, these flats being parallel with each other. Shell 25 has a bore 29 of a predetermined diameter, and the two flattened ends 27 and 28 of the shell have aligned bolt clearance apertures 31 and 32 respectively.

Plug 26 is also of generally cylindrical shape and has a slightly smaller diameter than bore 29. The main portion of plug 26 has the same length as bore 29, and a bolt clearance aperture 33 is formed in the plug as seen in FIGS. 3 and 4. This aperture is elongated at right angles to the bolt axis, in order to permit axial movement of the plug with respect to the shell from an intermediate position shown in FIG. 3 to shifted position as shown in FIG. 4.

Enlargements are formed at the opposite ends of plug 26, these enlargements normally being outwardly of shell 25. In the embodiment of FIGS. 1 through 4, one end of the plug has a bar 34 integral therewith, this bar extending across the plug and having a length slightly longer than the unstressed diameter of bore 29. The amount of this slight excess length is predetermined so that when a specified force is exerted between surfaces 27 and 28 of shell 25, bore 29 will be deformed sufficiently to allow bar 34 (extending at right angles to the bolt) to be pushed into bore 29, as seen in FIG. 4.

The other end of plug 26 is provided with an enlarged rim 35. The purpose of this rim is to prevent plug 26 from falling out of shell 25 when the gauge is disassembled from bolt 15.

To initially assemble gauge 24, shell 25 is compressed across its two flats 27 and 28 and bar 34, while being held perpendicular to the line of force, is pushed through the deformed bore 29. The force is now released and plug 26 is trapped in shell 25 by bar 34 and rim 35.

To use gauge 24, it is assembled on nut 15 with flat 28 engaging cap 22 of abutment member 18. Nut 23 is then threaded on bolt 15 so as to engage the other flat 27 on shell 25. Because slot 33 extends through plug 26 at right angles to bar 34, the bar will be held in the position as shown in FIG. 1, at right angles to the extent of the bolt.

Upon tightening of nut 23, shell 25 will be distorted so that bore 29 thereof begins to elongate in a direction at right angles to the line of force. As the operator tightens bolt 23, he will press with his finger 36 against part 34. When the predetermined bolt tension has been reached, the elongation of bore 29 will be just sufficient to enable the operator to push bar 34 into bore 29. This will indicate to the operator that the bolt tension is just at the desired level.

The gauge is left in position although the operator may push plug 26 back from the FIG. 4 to the FIG. 3 position, At any time the bolt tension may be tested by again pushing on bar 34. If bar 34 fits loosely in bore 29 this will indicate that there is too much tension in the bolt; if on the other hand, bar 34 cannot be pushed into bore 29, this will show that the tension is still insufficient.

FIGS. 5 through 9 show a second embodiment of the invention which is basically the same as the first embodiment except that the cap 101 is now welded to gauge 102 instead of being secured to extension 103 of abutment member 104. The action of the device will however, be the same, cap 101 fitting over extension 103 during the operation. This embodiment is intended for assemblies where no cap 22 or a similar adapter member is provided on abutment member 104 of the strap for transmitting the force between the gauge 102 and the abutment member.

Another difference between the two embodiments is that in the case of gauge 102, plug 105 thereof has two bars 106 and 107 instead of one bar and an enlarged rim. Bar 107 is at right angles to bar 106 and is used only to retain plug 105 in position, and not to gauge bolt tension.

I claim:

1. In a gauge for indicating the degree of tension in a bolt or the like, a shell having a bore of predetermined diameter and a pair of oppositely disposed parallel flat surfaces, there being aligned bolt clearance apertures through said flat surfaces, one of said flat surfaces being adapted to receive pressure from a nut threaded on said bolt and the other flat surface adapted to receive pressure from an abutment resisting nut tightening, and means for detecting when the elongation of said shell in a direction perpendicular to the bolt axis has reached a predetermined point in response to the tightening of said nut comprising a plug disposed within said bore, there being an elongated bolt clearance aperture in said plug, and an enlarged portion at one end of said plug having a predetermined dimension at right angles to said bolt axis when the bolt passes through said bolt clearance slot, said dimension being slightly larger than the unstressed shell bore diameter.

2. The combination according to claim 1, further provided with a cap secured to said one flat side of the shell for engagement with an abutment member.

3. In a gauge for indicating when the tension in a T-bolt for tightening a strap has reached a predetermined value, an abutment member retainable by a looped portion at one end of said strap, said abutment member having an axially extending portion and being freely slidable over said bolt, a gauge having a shell with a bore of predetermined diameter and a pair of oppositely disposed parallel flat sides, a cap between one of said sides and the axially extending portion of said abutment member, there being a pair of aligned bolt clearance apertures in said flat sides, the other flat side being engageable by a nut threaded on said bolt, whereby tightening of the nut will cause elongation of said bore in a direction perpendicular to the bolt axis, a plug in said bore having a main portion with the same length as said shell, there being a bolt clearance slot in said plug elongated in a direction perpendicular to the bolt axis, and a pair of enlarged portions at the opposite ends of said plug for retaining the plug in said shell, at least one of said enlarged portions comprising a bar extending at right angles to the bolt axis, the length of said bar being greater than the unstressed shell bore diameter by a small but predetermined amount, whereby the bar may be pushed into said bore when a predetermined bolt tension has been attained.

4. The combination according to claim 3, said cap being secured to said shell.

5. The combination according to claim 3, said cap being secured to said axially extending portion of the abutment member.

6. The combination according to claim 3, the other enlarged portion comprising a rim on said plug.

7. The combination according to claim 3, the other enlarged portion comprising a bar extending at right angles to said first bar.